Aug. 27, 1940.   B. L. YORK   2,212,764
MOLD
Filed Jan. 22, 1940
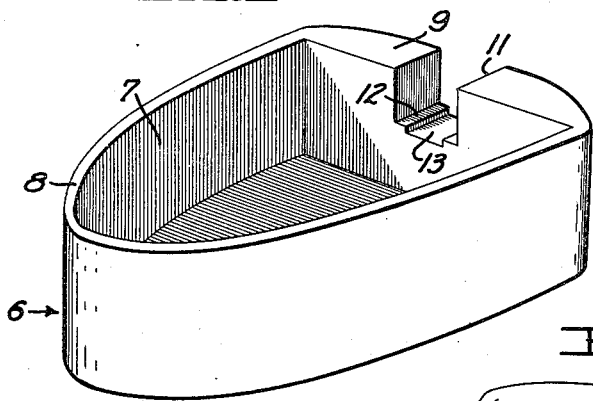
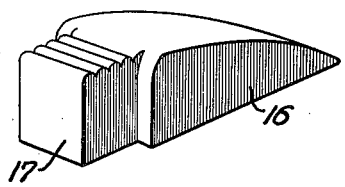
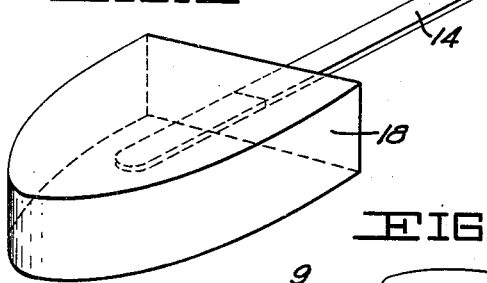
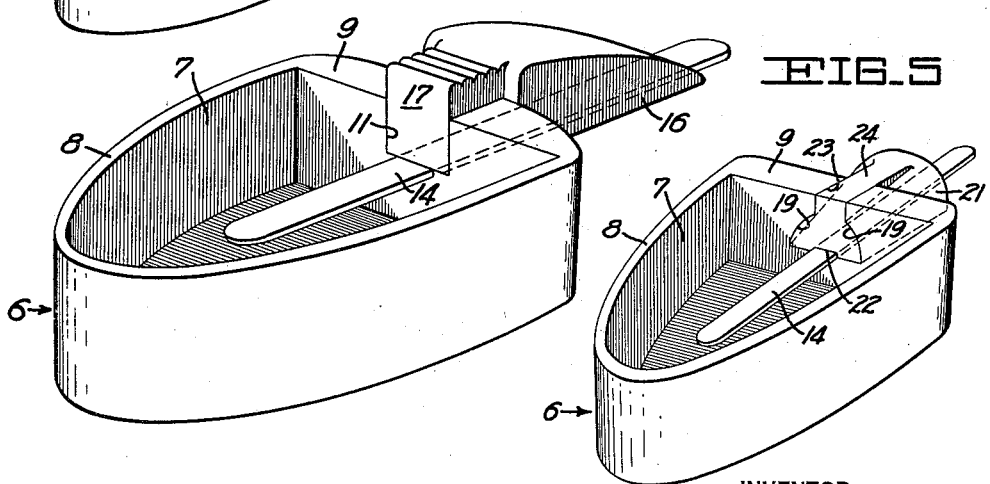
INVENTOR
Bertrand L. York
BY
Harry C. Schweda
ATTORNEY Patented Aug. 27, 1940

2,212,764

UNITED STATES PATENT OFFICE 2,212,764

MOLD

Bertrand L. York, Piedmont, Calif.

Application January 22, 1940, Serial No. 315,049

6 Claims. (Cl. 107—19)

This invention relates to devices for forming articles of moldable material.

It is an object of the invention to provide a simple mold for forming frozen confections in the freezing compartment of a household refrigerator.

Another object of the invention is to provide a mold in which may be positioned a handle member so that when the molded article is formed it may be removed from the mold with the handle member embedded therein.

A further object of the invention is to provide, in a mold for forming objects of a congealable liquid and provided with an entrance opening, below the normal level of the liquid in the mold, through which a handle member may extend to enter the mold cavity, simple means for sealing the said entrance opening against the escape of any of the liquid from the mold.

The invention possesses other objects and features of advantage which, together with the foregoing, will be specifically set forth in the detailed description of the invention hereunto annexed. It is to be understood that the invention is not to be limited to the specific form thereof herein shown and described as various other embodiments thereof may be employed within the scope of the appended claims.

Referring to the drawing:

Figure 1 is a perspective view of the mold of my invention.

Figure 2 is a perspective view of the insert holder and stopper.

Figure 3 is a perspective view of the completely assembled mold structure.

Figure 4 is a perspective view of the completed molded article formed in the mold.

Figure 5 is a perspective view of the mold of my invention showing a modified form of insert holder and stopper.

In detail, my invention comprises a mold, preferably formed of cast metal such as aluminum, having a body 6 in which a mold cavity 7 is provided. The cavity 7 may be given any desired form such as rectangular or circular or any combination of the two such as that shown in the drawing. For the most part, the side wall 8 of the mold may be made relatively thin so as to facilitate heat transmission but it is preferable to make one portion 9 of the wall relatively thick. In this thickened wall portion is formed a notch 11 which extends entirely through the wall and whose bottom 12 lies substantially midway between the top and bottom of the mold cavity. In the bottom 12 of the notch 11, is formed a groove 13 for receiving, as is shown in Figure 3, an insert which may be the wooden handle member 14. The width and depth of the groove 13 are made to correspond with the width and thickness of the insert 14 so that the latter will fit snugly into the groove.

Means is provided which simultaneously serves as a handle for lifting the mold and which seals the mold against the leakage of fluid from the mold cavity. I provide, as shown in Figure 2, a block of preferably resilient material such as rubber having a plane bottom, a tapered handle portion 16 formed at one end thereof, and a transversely narrowed stopper 17 formed at the opposite end thereof. The stopper 17, after the insert 14 has been positioned in the groove 13, is pressed downwardly into the notch 11 until it firmly engages both the bottom 12 of the notch and the upper surface of the insert. The frictional engagement of the rubber stopper with the vertical sides of the notch will securely retain the insert in place in the mold and the stopper, in completely filling the notch, will act as a dam to seal the mold against the leakage of fluid from the cavity 7 through either the notch 11 or the groove 13. The tapered extension 16 of the stopper, overlying the exposed portion of the insert, serves as a handle by means of which the mold may be lifted and carried.

After the mold has been set up as shown in Figure 3, the cavity 7 may be filled with a suitable fluid, such as water sweetened with sugar and tinted with coloring matter, and then placed in the freezing compartment of a refrigerator. After allowing sufficient time for the fluid to congeal, the mold may be removed from the refrigerator, the rubber stopper may be removed from the mold and the mold may be held momentarily in a stream of water, so as to slightly warm the mold, whereupon the finished confection consisting of the frozen mass 18 of fluid may be lifted from the mold with the handle, formed by the insert 14, embedded therein. This forms an edible delicacy in the form of a lollypop.

In Figure 5 I have shown a mold incorporating a modified form of insert holder and stopper. In this structure, the mold body 6 is the same as that previously described with the exception that the thickened wall portion 9 is provided, in place of the straight-sided notch 11, with a notch having undercut arcuate portions 19 which are concentric and are, transversely of the wall portion 9, disposed slightly divergent so as to provide a tapered rubber plug 21 may be inserted. The flat side of the plug 21 is provided with a longitudinal groove 22 in which the insert 14 may be seated. A notch 23, opening into the semicircular notch, permits the insert 14 to be lifted from the mold after the insert has been frozen into the congealed fluid in the mold, and also receives a straight-sided fin 24 formed integrally with the plug 21. The tapered plug 21 provides an absolutely watertight seal for the lower portion of the mold and also securely clamps the insert 14 in place. The fin 24 provides a stopper for the upper portion of the notch so as to permit the mold to be completely filled with fluid.

Having thus described my invention, what I claim as new and desire to secure by Letters Patent is:

1. A mold of the class described comprising a mold body having an upwardly opening cavity therein surrounded by a continuous side wall, said side wall having therein an opening through which an insert member may extend to enter said cavity, and a deformable plug to enter and for completely filling and sealing said wall opening.

2. A mold of the class described comprising a mold body having an upwardly opening cavity therein surrounded by a continuous side wall, said side wall having therein an opening through which an insert member may extend to enter said cavity, and a groove in the bottom of said notch in which said insert of complementary form may be seated, and means disposed in said notch and engaging said insert for holding said insert in the groove and for sealing said notch.

3. A mold of the class described comprising a mold body having an upwardly opening cavity therein surrounded by a continuous side wall, said side wall having therein an opening through which an insert member partially disposed exteriorly of said body may extend to enter said cavity, and a resilient member disposed in and sealing said notch and provided with an extended portion overlying the portion of said insert exterior of the body to serve, in conjunction with said exterior portion of the insert, as a handle for the mold.

4. A mold of the class described comprising a mold body having an upwardly opening cavity therein surrounded by a continuous vertical side wall, said side wall having therein a notch, extending downwardly to a point substantially midway of the depth of said cavity, and a groove in the bottom of said notch in which an insert member of complemental cross-sectional form may be seated with the upper surface of said insert coinciding with the upper edge of said groove and with portions of said insert extending into said cavity and projecting exteriorly of said body, a rubber stopper disposed in and in frictional engagement with sides of said notch, and engaging the bottom of the notch and the upper surface of the insert, for positioning said insert and for sealing said notch, and a portion of said stopper being extended to a position overlying the exterior portion of said insert to form, in conjunction with the latter, a lifting handle for the mold.

5. A mold of the class described comprising a mold body having an upwardly opening cavity therein surrounded by a continuous vertical side wall, said side wall having therein a notch extending downwardly to a point substantially midway of the depth of said cavity, said notch having side wall portions thereof arcuately curved and mutually concentric and angularly divergent axially of the notch, and a rubber plug of axially divided frusto-conical form in said notch, said plug having extending longitudinally along the flat surface thereof defining the plane of division of said frusto-conical form, a groove in which an insert of complementary cross-sectional form may be seated.

6. A mold of the class described comprising a mold body having an upwardly opening cavity therein surrounded by a continuous vertical side wall, said side wall having therein a notch extending downwardly to a point substantially midway of the depth of said cavity, said notch having upper side wall portions thereof disposed in parallel relation and lower side wall portions thereof arcuately curved and mutually concentric and angularly divergent axially of the notch, a rubber plug of axially divided frusto-conical form in engagement with said lower side wall portions of the notch, said plug having extending longitudinally along the flat surface thereof, defining the plane of division of said frusto-conical form, a groove in which an insert of complementary cross-sectional form may be seated, and a fin formed integrally with and extending from said plug and engaging the upper side wall portions of said notch.

BERTRAND L. YORK.